United States Patent

[11] 3,581,449

[72] Inventors Franz R. Huber
Assling;
Rudolf Frimberger, Furth, near Munich, both of, Germany
[21] Appl. No. 754,336
[22] Filed Aug. 21, 1968
[45] Patented June 1, 1971
[73] Assignee Rohde & Schwarz
Munich, Germany
[32] Priority Aug. 23, 1967
[33] Germany
[31] P 16 84 900.6

[54] APPARATUS FOR REDUCING KARMAN VORTEX STREET EFFECTS ON A STRUCTURE
8 Claims, 3 Drawing Figs.

[52] U.S. Cl. ............................................ 52/84, 52/737, 343/887
[51] Int. Cl. ........................................ E04h 12/00, E04h 9/14

[50] Field of Search............................................ 52/84, 740, 737, 738, 739, 173, 245, 110; 343/887

[56] References Cited
UNITED STATES PATENTS

| | | | |
|---|---|---|---|
| 855,204 | 5/1907 | Scofield................... | 52/740 |
| 1,013,578 | 1/1912 | Abbott..................... | 52/738X |
| 1,016,984 | 2/1912 | Collins..................... | 52/740 |
| 3,076,533 | 2/1963 | Scruton et al............. | 52/737 |
| 3,214,877 | 11/1965 | Akin........................ | 52/740X |
| 3,245,177 | 4/1966 | Chen....................... | 52/173X |

*Primary Examiner*—Price C. Faw, Jr.
*Attorney*—Hill, Sherman, Meroni, Gross & Simpson

ABSTRACT: Cylindrical structure for use as an outdoor television antenna or the like, on which are formed a plurality of axially spaced embossments for reducing the oscillatory movements of the structure which may be caused by the development of a Karman vortex street due to wind currents.

Fig. 1

PATENTED JUN 1 1971 3,581,449

INVENTORS
FRANZ REINHOLD HUBER
RUDOLF FRIMBERGER

BY Hill, Sherman, Meroni, Gross & Simpson ATTORNEYS

APPARATUS FOR REDUCING KARMAN VORTEX STREET EFFECTS ON A STRUCTURE

BACKGROUND OF THE INVENTION

This invention relates generally to cylindrical structures such as television antennas and the like which are intended for outdoor use and which are subjected to the forces and effects of wind currents, and more particularly relates to a method and apparatus for reducing or entirely eliminating the oscillatory movements of such structures which may be caused by the development of Karman Vortex Street due to wind currents.

Cylindrical structures, such as the masts of television antennas, smokestacks, transmission lines, pipelines and the like which are located outdoors and which are subjected to wind currents are sometimes adversely affected by the wind and by the development of a phenomenon generally referred to by the investigators as Karman Vortex Street. A Karman Vortex Street may be defined as the periodic shedding of eddies in the wake of bluff cylindrical bodies when a fluid such as air moves across the cylindrical bodies in a direction perpendicular to the axes of the bodies. This periodic shedding of eddies occurs first from one side of the body, and then from the other which is an unusual phenomenon because the oncoming flow may be perfectly steady. Regular, perfectly periodic eddy shedding occurs within a given range of Reynolds numbers, based upon cylinder diameter. Above this range a degree of randomness begins to occur in the shedding which becomes progressively greater until the wake is completely turbulent.

Vortex Streets can be created by steady winds blowing past smokestacks, the masts of television antennas and the like. The Vortex Streets give rise to oscillating lateral forces on the shedding body. If the slenderness ratio (that is, the ratio of height to diameter) of the shedding body is sufficiently great (in the range of about five or more) and if the vortex shedding frequency is near a natural vibration frequency of the body, the resonant response may cause structural damage. The Aeolin tones or singing of wires in a wind is an example of a forced oscillation due to a Vortex Street.

In view of the oscillatory movements of such cylindrical bodies, many such structures such as antenna masts, smokestacks and the like must be constructed more stably than would otherwise be necessary.

SUMMARY OF THE INVENTION

In light of the foregoing, the present invention may be summarized as comprising a method of and apparatus for, reducing the oscillatory effects of Karman Vortex Street on slender cylindrical structures. The invention may be further characterized as comprising means forming on the outer cylindrical surface of the structure a plurality of axially spaced embossments, each of which comprises an outer surface which is so configured as to present an axial profile, a substantial portion of which profile extends at an angle or obliquely to the outer cylindrical wall of the structure. The embossments serve to reduce or completely eliminate the rhythmical vortex sheddings and the at least partially oblique axial profile of the embossments substantially reduces the coefficient of wind resistance of the cylindrical structure which would obtain, if the side faces of the embossments were completely radial. Furthermore, the above-mentioned oblique configurative profile of the embossments reduces pressure disturbances which would otherwise result due to the existence of long eddies running axially to the cylindrical structure which separate from the structure in the manner of Karman Vortices and as a result, again cause oscillations in the structure.

In view of the foregoing, it is an object of the present invention to provide a method of and apparatus for reducing or eliminating the adverse oscillatory effects of a Karman Vortex Street on a cylindrical structure.

Another object is to avoid the necessity of increasing the rigidity and stability of antenna masts, pipe and transmission lines and other such cylindrical structures located outdoors and subject to the forces of wind currents merely to compensate for the oscillatory effect of a Karman Vortex Street acting on the structure.

Another object is to reduce the effects of the Karman Vortex Street without substantially increasing the coefficient of wind resistance of the cylindrical structure.

Another object is to reduce the effects of the Karman Vortices without producing substantial pressure disturbances on the cylindrical structure as the result of the generation of long eddies running axially to the cylinder and separating from the cylinder in the manner of Karman Vortices to again cause oscillation of the cylindrical structure.

Another object is to reduce oscillatory movement of the cylindrical structure without substantially increasing the size or rigidity of the structure and without substantially increasing manufacturing costs.

Many other features, advantages and additional objects of the present invention will become manifest to those versed in the art upon making reference to the detailed description which follows and to the accompanying sheets of drawings, in which preferred structural embodiments incorporating the principles of the present invention are shown by way of illustrative example only.

DESCRIPTION OF THE PREFERRED EMBODIMENTS

Figures 1, 2, 3:
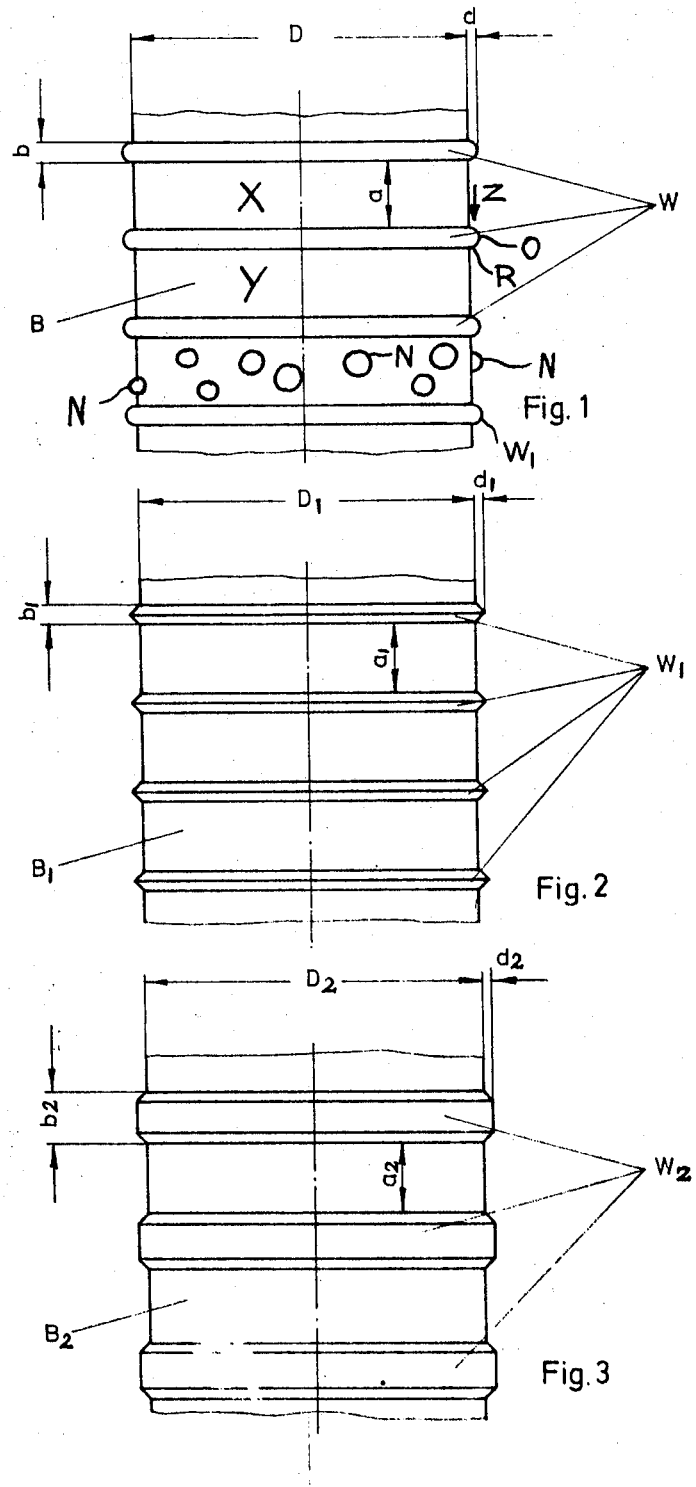
FIG. 1 is a fragmentary elevational view of a cylindrical structure such as an outdoor television mast or the like constructed in accordance with the principles of the present invention.
FIGS. 2 and 3 are similar to FIG. 1 but are illustrative of other forms of the invention.

Although the principles of the present invention are applicable to any cylindrical structure located outdoors and subject to wind forces and having a slenderness ratio sufficient to result in oscillatory movements due to the effects of a Karman Vortex Street, the invention the particular utility in the field of masts for outdoor television antennas and in the illustrative embodiments herein shown the cylindrical structure is in the from of an Antenna mast.

Referring to FIG. 1, reference character $B$ designates a section of a cylindrical television antenna mast. Formed on the cylindrical outer surface of the mast are a series of axially spaced circumferentially continuous embossments $W$ constructed in the form of annular rings. The axes of the rings are coaxial with the axis of the cylindrical structure $B$.

The annular rings or embossments $W$ have been found to be extremely effective in reducing or entirely eliminating the adverse effects of a Karman Vortex Street acting on the structure $B$ to produce oscillatory movements by preventing the rhythmic or periodic sheddings or vortices on the downwind side of the structure $B$. The outer surfaces $O$ of the embossments or rings $W$ are illustrated as being semicircularly shaped in FIG. 1. The embossment $W_1$ in FIG. 1 has an elliptical profile and is illustrative of an alternate form of the invention. This configuration of the outer surface $O$ results in a substantial portion of the outer surface $O$ extending at an angle to, or obliquely to the outer cylindrical wall of the structure $B$. Thus, with the exception of the radially outward extremity of the outer surface $O$ insofar as the axial profile thereof is concerned, which extremity is parallel to the cylindrical wall of the structure $B$, and those portions of the outer surface $O$ identified at reference character $R$ and which are immediately adjacent and perpendicular to the cylindrical wall of the structure $B$, the outer surface $O$ extends at an angle which is oblique to the cylindrical wall of the structure $B$.

The configuration of the axial profile of the embossments or rings $W$ has an effect on the overall efficiency of the present invention in reducing undesirable oscillatory movements of the cylindrical structure $B$. It has been determined, for example, that if the configurative relationships of the various portions of the outer surfaces of the embossments $W$ are such that substantial portions of the axial profile extend radially with respect to the axis of the structure B, not only is the coefficient of wind resistance increased, but in addition there are generated long eddies which run axially of the structure B and which separate from the structure in the manner of Karman Vortices to again cause oscillations of the structure B.

It has also been determined that the existence of substantial portions of the axial profile to the embossments W extending obliquely with respect to the cylindrical outer wall of the structure B has the effect of eliminating the transfer of pressure disturbances axially along the outer wall of structure B from one side of the annular rings or embossments W to the other sides thereof.

Reference character d in FIG. 1 designates the radial height of the embossments W. We have also discovered that this dimension of the axial profile of the embossments is significant in the degree of attenuation of the oscillatory effects of a Karman Vortex Street and that optimum results are obtained when the radial height d is in the order of about one-fiftieth of the diameter of the cylindrical structure B or greater.

Also in FIG. 1 reference character b designates the axial width of the embossments W. We have determined that this dimension is also significant in that if very thin annular embossments W are utilized pressure disturbances may again be transferred axially from one side of the embossments to the other and there will thus be propagated pressure disturbances through the material of which the embossments are constituted.

We have discovered that for optimum results the axial dimension b of the embossments W should be in the order of about one twenty-fifth of the diameter of the cylindrical structure B or greater. Reference character a in FIG. 1 designates the spacing between the rings and may be from one-tenth to one-fiftieth of the diameter D.

It has also been determined that the oscillatory effects of a Karman Vortex Street can be materially reduced even if the embossments formed thereon are not circumferentially continuous. For example, a plurality of axially space ( as well as circumferentially spaced) embossments N are also disclosed in FIG. 1 as being formed on the outer cylindrical surface of the structure B. Although the embossments N are illustrated as being formed only on a section of the fragmental portion of the structure B illustrated as FIG. 1 it will be appreciated that the formation of the embossments N would, in the practice of the invention, extend to substantially the entire axial length of the structure B. It is noted that in the illustrated embodiment, the axial profile of the embossments N are semicircularly shaped and thus a substantial portion of the axial profile extends obliquely with respect to the outer cylindrical wall of the structure B. It is noted that the embossments N have a substantial beneficial effect in reducing the oscillatory movements of the structure B even when arranged in an irregular distribution along the structure B as shown in FIG. 1.

In connection with the semicircular shape of the axial profile of embossments W and N it will be appreciated that those portions of the outer surfaces of the embossments immediately adjacent the outer cylindrical wall of the structure B extend perpendicularly thereto. The adverse effect of these very minor perpendicular portions of the axial profiles of the embossments is negligible since the portions of the profile which extend obliquely to the structure B predominate. For example, a pressure disturbance which would otherwise run from one section X of the cylindrical structure B to an adjacent section Y in the direction of the arrow Z is interrupted and substantially reduced or completely eliminated as a result of the predominately oblique disposition of the major portions of the axial profiles of the embossments W with respect to the outer cylindrical surface of the structure B. As a result of this interruption simultaneously existing turbulences in zones X and Y are separated from the outer surface of the structure B and cohesive Karman Vortices are avoided.

The embossments N disclosed in FIG. 1 may be advantageously utilized alone or in combination with the circumferentially continuous embossments W. As a result of the embossments N there is also produced interferences of axial flow along the structure B and consequently the irregular separation of vortices is enchanced. Consequently, the shedding of cohesive vortices in the form of Karman eddies is avoided.

Another form of the invention is illustrated in FIG. 2 wherein the reference characters used in FIG. 1 are repeated for simplicity in order to designate similar parts to which have been added the suffix 1.

As illustrated, the embossments $W_1$ have a triangular axial profile as contrasted with the semicircular axial profile of the embossments W of FIG. 1. In this form of the invention the entire axial profile of each of the embossments $W_1$ extends obliquely with respect to the outer cylindrical wall of the structure $B_1$. The relatively sharp outer edge of the embossments $W_1$ may, however, render this from of the invention somewhat less desirable than the from thereof illustrated in FIG. 1 but in respect of the ability prevent the Karman Vortex Street and the undesirable effects thereof, the FIG. 2 embodiment is comparable to that shown in FIG. 1.

FIG. 3 illustrated another form of the invention wherein the axial profile of the embossments $W_2$ is in the form of a trapezoid. The same configurative relationships of dimensions b and d applicable to the FIG. 1 form of the invention are also applicable to the forms illustrated in FIGS. 2 and 3. The axial profile of the embossments may also be elliptically and conically shaped in addition to the semicircular, triangular or pyramidal and trapezoidal forms shown in FIGS. 1—3. Thus, there has been disclosed herein a method of and apparatus for substantially reducing or entirely eliminating any damaging oscillations of a slender cylindrical structure such as a television antenna mast or the like as a result of Karman Vortex sheddings. In addition the coefficient of wind resistance of the cylindrical structure is not appreciably increased as contrasted with a smooth cylindrical structure. Furthermore, the profile which is exposed to the wind forces is not appreciably increased as contrasted with a smooth cylinder so that the wind forces acting on the cylindrical structure are essentially no greater than those which would obtain without the embossments W.

Although minor modifications might be suggested by those versed in the art, it should be understood that we wish to embody within the scope of the patent warranted hereon all such modifications as reasonably come within the scope of our contribution to the art.

We claim as our invention:

1. In a cylindrical structure normally subject to aerodynamic effects such as the mast of a television antenna or the like having a slenderness ration sufficient to cause oscillatory movement when subjected to wind forces due to the development of a Karman Vortex Street around the structure, the improvement of means forming on the outer cylindrical wall of the structure a plurality of axially spaced embossments, said embossments each comprising an outer surface which is so configured to present an axial profile a substantial portion of which extends obliquely to said outer cylindrical wall of said structure, said embossments comprising annular rings which extend circumferentially continuously around the said outer cylindrical wall.

2. The invention as defined in claim 1 wherein said embossments project radially outwardly of said outer cylindrical wall a distance at least equal to about one-fiftieth of the diameter of said cylindrical structure.

3. The invention as defined in claim 1 wherein each of said embossments extends axially a distance equal to at least about one twenty-fifth of the diameter of said cylindrical structure.

4. The invention as defined in claim 1 wherein at least a portion of the axial profiles of said embossments are arcuately shaped.

5. The invention as defined in claim 1 wherein the axial profiles of said embossments are semicircularly shaped.

6. The invention as defined in claim 1 wherein the axial profiles of said embossments are trapezoidally shaped.

7. The invention as defined in claim 1 wherein the axial profiles of said embossments are elliptically shaped.

8. The invention as defined in claim 1 wherein the axial profiles of said embossments are pyramidally shaped.